Figure 1:
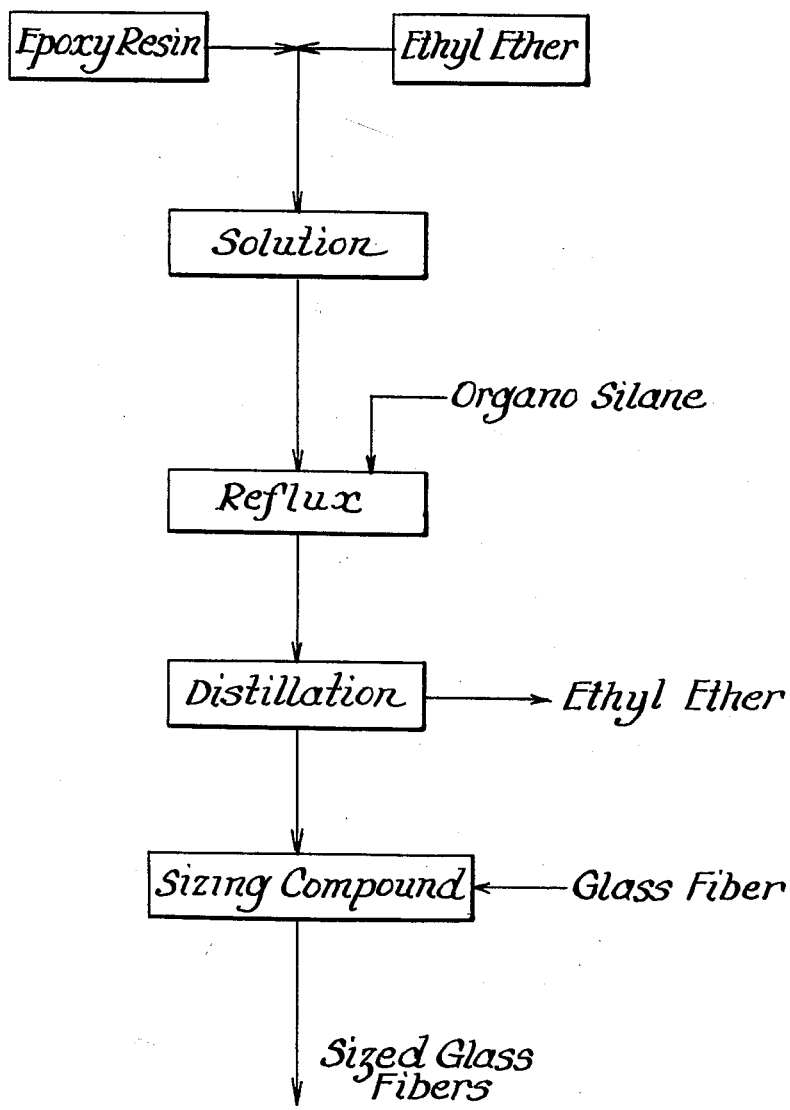

Feb. 16, 1965    A. MARZOCCHI ET AL    3,169,884
GLASS FIBERS SIZED WITH SILANE-EPOXY RESIN COMPOUNDS AND METHOD
Filed March 4, 1959

INVENTORS
Alfred Marzocchi
Nicholas S. Janetos
by Staelin & Overman
Att'ys

United States Patent Office 3,169,884
Patented Feb. 16, 1965

3,169,884
GLASS FIBERS SIZED WITH SILANE-EPOXY RESIN COMPOUNDS AND METHOD
Alfred Marzocchi, Cumberland, and Nicholas S. Janetos, Providence, R.I., assignors to Owens-Corning Fiberglas Corporation, a corporation of Delaware
Filed Mar. 4, 1959, Ser. No. 797,051
7 Claims. (Cl. 117—126)

This invention relates to siliceous fibers and structures formed thereof and more particularly to glass fibers provided with a surface treatment which promotes a stronger bonding relationship between the glass fiber surfaces and synthetic organic polymeric materials which are employed in combinations with the glass fibers in the manufacture of fiber reinforced plastics, laminates, coated fabrics and the like.

For purposes of description of the invention, reference will be made to the treatment and use of glass fibers but it will be understood that the concepts of this invention will be applicable to others of the siliceous fibers having the characteristics of glass fibers from the standpoint of strength and inertness and from the standpoint of the physical and chemical characteristics of the fibers which raise the problems of anchorage to resinous systems.

A great number of uses have been developed for glass fibers. One of the more important of the applications, based upon the exceptionally high strength characteristics of the glass fibers, has been as a reinforcement or strengthening agent for synthetic resinous polymers or elastomers in the manufacture of plastics, laminates, coated fabrics and the like. It has been found that unless a strong bonding relationship is capable of being established and retained between the glass fiber surfaces and the organic polymeric material, the contribution of strength by the glass fibers is considerably less than could otherwise be realized. Thus, a considerable amount of research and development has been expended in maximizing the bonding relationship between the glass fiber surfaces and the organic resinous or other organic polymeric materials.

In this respect, glass and the like synthetically formed siliceous fibers are substantially unlike natural fibers in that the latter offer the possibilities of either a strong physical bond or a strong chemical bond or both with resinous materials whereas it is difficult to establish a strong physical or chemical bond with glass fibers as formed. For example, most natural fibers and some of the siliceous fibers, such as asbestos, are characterized by surface roughness or high porosity sufficient to enable resinous materials to acquire a strong hold onto the fibers. On the other hand, glass fibers are non-porous and have perfectly smooth surfaces such that there is nothing onto which the resinuous materials can grab. Most natural or synthetic resinous fibers contain groupings on the surfaces which are more highly receptive to resinous materials than to water such that an anchorage can be established between the resinous materials and the organic or natural fiber surfaces which is not disturbed by water. On the other hand, the groupings that predominate on the glass fiber surfaces are hydrophilic in character such that only a weak bond can be established in the first instance between the synthetic resinous or polymeric materials and the glass fiber surfaces. Such bond as is capable of being initially established is substantially reduced by a film of water that preferentially forms between the resinous material and the glass fiber surfaces in the presence of moisture or high humidity. Thus fuller utilization of the strength and other desirable properties of the glass fibers in combinations with organic polymeric or resinous materials has depended somewhat on increasing the bonding relationship between the glass fiber surfaces and the organic polymeric materials and the ability to retain the desired bonding relationship under moist or high humidity conditions.

Over the past several years, research and development has produced a number of systems which are capable of use to render the glass fiber surfaces more receptive to resinous and other organic polymeric materials and to enhance the bonding relationship between the glass fiber surfaces and such resinous or polymeric materials. For the most part, such systems have been based upon the operation of an anchoring agent having at least one group which is capable of strong and relatively permanent attachment to the surfaces of the glass fibers and one or more other groupings to which the resinous or polymeric materials are capable of attachment whereby the anchoring agent is able to tie the resinous or polymeric materials onto the glass fiber surfaces.

In U.S. Patent No. 2,552,910, Dr. Steinman illustrated one of the systems wherein use is made of an anchoring agent in the form of a chromic (Werner) complex compound having a carboxylato group coordinated with the trivalent nuclear chromium atom in which the carboxylato group is of less than six carbon atoms and contains a highly functional group. The chromic atom of the complex is believed capable of strong attachment to the glass fiber surfaces while the functional group of the short chained carboxylato radical is capable of effecting strong attachment with resinous or polymeric materials. Dr. Steinman, in U.S. Patent No. 2,563,288, illustrated another system wherein use was made of an anchoring agent in the form of a silane, its hydrolysis products or its polymerization products having at least one of the organic groups attached to the silicon atom which contained less than seven carbon atoms and was formed with ethylenic unsaturation. The theory of operation is believed to reside in the ability of the silicon atom to become strongly attached to the silicon oxide groupings present on the surfaces of the glass fibers while the ethylenic group provides means for attachment of resinous or polymeric materials preferably formed by addition polymerization through ethylenic or acetylenic groupings in the monomer of which the polymer is formed.

The effectiveness of an anchoring agent depends greatly upon the availability of the glass fiber surfaces for attachment. Thus, where a size has previously been applied to the glass fiber surfaces in forming to enable the fibers to be processed into strands, yarns and fabrics without destruction of the fibers by mutual abrasion, it has been necessary to remove the size from the glass fiber surfaces before application of the anchoring agent. Difficulties arise in the application of the anchoring agent directly to the glass fibers in forming because the anchoring agent is, in itself, substantially incapable of the lubricity and bonding required for processing the fibers into strands or fabrics. The anchoring agent is incapable further of proper protection of the glass fiber surfaces to prevent destruction by mutual abrasion. Thus, in commercial practice, a rather elaborate, time consuming and expensive operation is employed wherein the glass fibers are sized in forming, the sized glass fibers are processed into strands and woven into fabrics, the fabrics are washed or heat treated to remove the size and then the cleaned glass fibers are coated with the anchoring agent. Such multiple operations not only make the process expensive and time consuming but it has been found that the glass fibers are damaged to some extent during handling, while in an unprotected state, after the size has been removed.

Numerous attempts have been made to adapt a system wherein the anchoring agent can be incorporated as a component in the size composition thereby to produce a size which has the desired processing characteristics for fabrication of the fibers into yarns and fabrics and the desired performance characteristics which will render the sized fibers more receptive to resinous or organic polymeric materials without the necessity to remove the size originally applied. While such combinations provide improvements by comparison with size compositions without anchoring agents, full benefit of the anchoring agent is incapable of being achieved because of the dilution of the anchoring agent in the size cmposition such that only a small proportion of that present in the applied coating is effective for the intended purpose.

It is an object of this invention to produce and to provide a method for producing glass fibers having a treatment on the surface in the form of a coating which is capable of the combination of functions of protecting the glass fiber surfaces and bonding the fibers in strand or yarn formation while at the same time rendering the fibers highly receptive to organic polymeric or resinous materials which are employed in combination with the glass fibers in the manufacture of plastics, laminates, coated fabrics and the like structure. It is a related object to produce a new and improved composition containing an anchoring agent for use in the treatment of glass fibers without dilution of the anchoring agent or its effectiveness to tie in the organic polymeric resinous materials with the glass fiber surfaces.

These and other objects and advantages of this invention will hereinafter appear and for purposes of illustration, but not of limitation, an embodiment of the invention is shown in the accompanying drawing in which—

Figure 2:
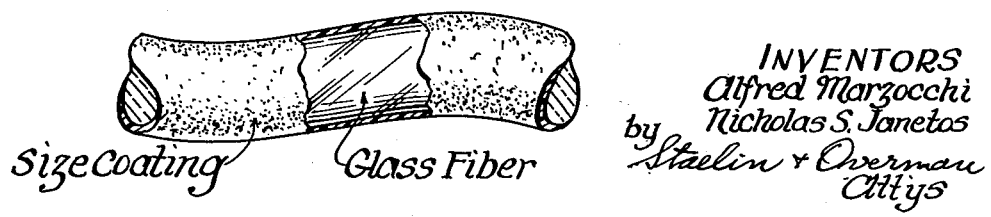

FIG. 1 is a flow sheet illustrating the fabrication of the sizing compound and the application thereof onto glass fibers; and FIG. 2 is a perspective view partially in section of a glass fiber filament sized in accordance with the practice of this invention.

In accordance with the practice of this invention, the glass fibers are treated to coat the surfaces with an anchoring agent in the form of a molecular construction which provides film forming characteristics for protection of the glass fiber surfaces, which is made up with radicals or groupings capable of strong and preferential attachment to the glass fiber surfaces and which contains other groupings that are effective to enable attachment of organic polymeric or resinous materials to the treated glass fiber surfaces. Thus the entire molecule functions simultaneously as protective agent and as an anchoring agent to provide (1) attachment to the glass fiber surfaces without dilution while, at the same time, the material is capable of the function of (2) a protective coating or size, and (3) a receptive base for resinous materials subsequently to be applied in the fabrication of glass fiber reinforced plastics, laminates, coated fabrics and the like.

One of the important concepts of this invention resides in an anchoring agent formed by the reaction of a silane with a film forming resinous component to tie in the silane as a part of the polymeric material. Thus the silicon atom, forming a part of the polymeric compound, is capable of anchoring the polymeric compound at spaced apart points to the glass fiber surfaces. Other groupings or radicals in the polymer or in the silane, now forming a part of the polymer, provide a receptive base for the resinous material while the film forming characteristics of the polymeric anchoring agent provide the characteristic of a size or finish to bond the plurality of glass filaments in the strand or yarn and to protect the glass fiber surfaces against destruction by mutual abrasion.

In one reaction to form polymeric compounds which may be referred to as silizenes, the silane enters the molecular compound by reaction with an amine group of the polymeric material or else used in the preparation or cure of a polymeric material. The reaction to join the silane into a part of the molecule to form the corresponding silizene may be illustrated by the following equation:

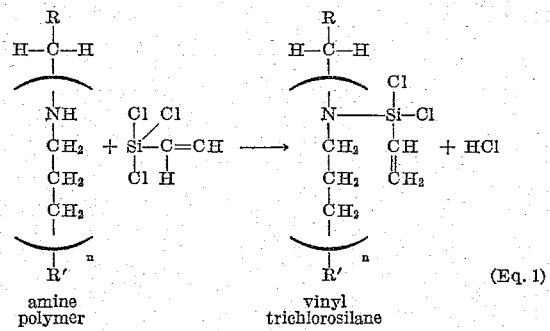

(Eq. 1)

amine polymer + vinyl trichlorosilane

R'=epoxy resin residue or polymeric amine residue

R'=R, or an amine group, or H to terminate chain

For example, the amine group to which the organo silane radical is tied may be a side chain on an epoxide resin as represented by the following equation:

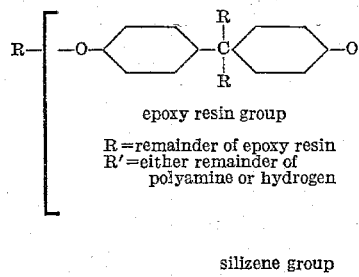

epoxy resin group

R = remainder of epoxy resin
R' = either remainder of polyamine or hydrogen silizene group (Eq. 2)

taneously as protective agent and as an anchoring agent to provide (1) attachment to the glass fiber surfaces The reaction between the compounds can also take the following course:

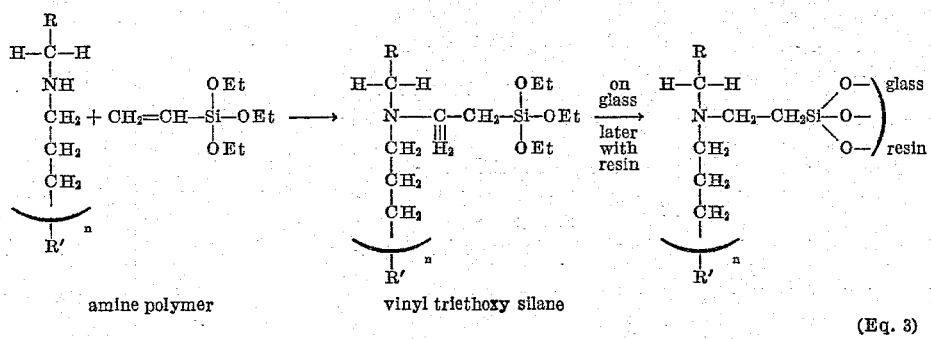

amine polymer + vinyl triethoxy silane (Eq. 3)

R = epoxy resin residue or polymeric amine residue

R' = R, or an amine group or hydrogen group to terminate chain

In another reaction to form polymeric compounds of the type embodying the features of this invention for use as a protective coating and an anchoring agent, an amino silane is reacted with an epoxy group forming a part of or to be used in forming a part of an epoxide resin. This reaction may be represented as follows:

$$EtO-\underset{\underset{EtO}{|}}{\overset{\overset{EtO}{|}}{Si}}-CH_2-CH_2-CH_2-NH_2 + -\underset{\underset{O}{\diagdown\quad\diagup}}{C-C-} \longrightarrow$$

gamma-amino propyl triethoxy silane     epoxide polymer $$\underset{\underset{EtO}{|}}{\overset{\overset{EtO}{|}}{EtO-Si}}-CH-CH-CH-N-\underset{\underset{OH}{|}}{\overset{\overset{H}{|}}{C}}-R \quad (Eq.\ 4)$$

$$\downarrow glass\ fiber \quad HC\text{—epoxide polymer (R)'}$$

$$glass\begin{pmatrix}-O\\-O-\\resin\ -O\end{pmatrix}Si-CH-CH-CH-C-\underset{\underset{OH}{|}}{\overset{\overset{H}{|}}{C}}\text{—polymer residue R}$$
$$HC\text{—polymer residue R'} \quad (Eq.\ 5)$$

In a system which does not rely upon joinder of the silane through an amine to form a part of the polymeric material, use can be made of a silanic acid which is reactive with an epoxy group forming a part of an epoxide chain or used to form a part of the epoxide chain, as represented by the following:

$$CH_2=CH-\underset{\underset{Cl}{|}}{\overset{\overset{Cl}{|}}{Si}}-H + H\underset{\underset{O}{\diagdown\quad\diagup}}{\overset{\overset{R}{|}}{C}}-\overset{\overset{R'}{|}}{CH} \longrightarrow$$

vinyl dichlorosilane     epoxy group $$CH_2=CH-\underset{\underset{Cl}{|}}{\overset{\overset{Cl}{|}}{Si}}-O-\underset{\underset{H}{|}}{\overset{\overset{H}{|}}{C}}-R \text{ or upon hydrolysis}$$
$$H\overset{|}{C}-R' \quad (Eq.\ 6)$$

$$CH_2=CH-\underset{\underset{O}{\diagdown\quad\diagup}}{Si}-\underset{\underset{OH}{|}}{\overset{\overset{OH}{|}}{C}}-R \text{ epoxide polymer}$$
$$O=C-R' \text{ epoxide polymer}$$
$$glass \quad (Eq.\ 7)$$

R and R' represent remainder of epoxide polymer.

One of the other ways in which the silane can be reacted to form a part of the polymeric film forming material is by way of reaction of the silane having one or more hydrolyzable groups with water to replace the hydrolyzable groups with a hydroxy group to form the corresponding silanol which can then be reacted with hydroxy, carboxy or amine groups in the amine or in the polymeric chain, as represented by the following:

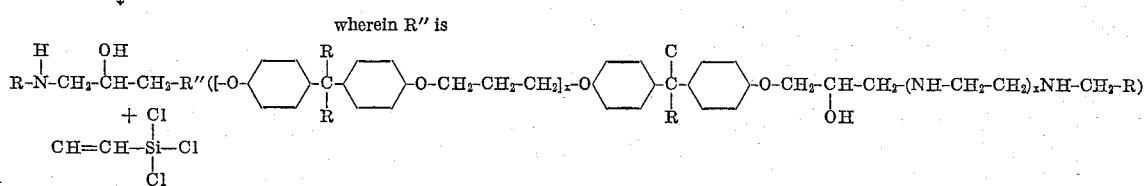

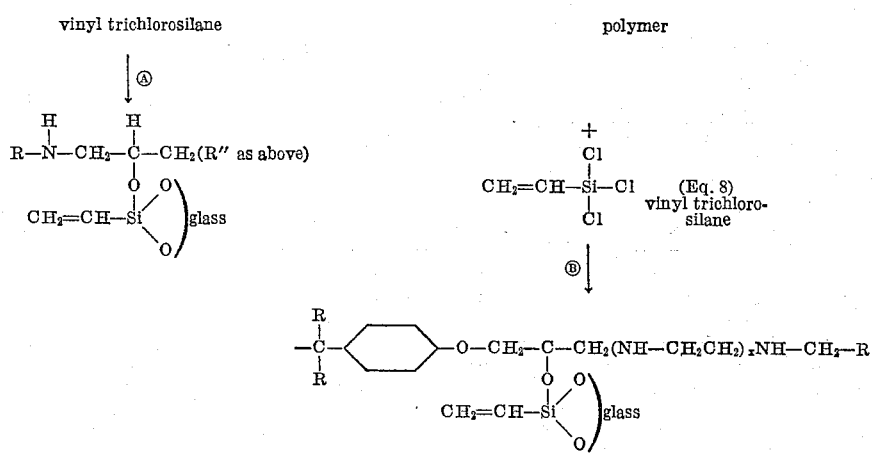

In the above Equation 8, the reaction to join the silane onto the amine is illustrated by the parts related to the letter "A" and the reaction to join the silane directly onto the epoxide chain is related to the parts indicated by the letter "B."

As schematically illustrated in the foregoing, the organo silicon radical forming a part of the polymer provides a silicon atom having hydrolyzable groups which are effective strongly and permanently to tie in the polymer as a protective coating onto the glass fiber surfaces. The resin to be subsequently applied to the treated glass fibers finds groupings in the epoxy resin portion of the coating to which strong attachment can be effected. In the alternative, when the silane radical contains an unsaturated ethylenic group, as when formed of vinyl trichlorosilane, allyl trichlorosilane, or the corresponding mono-, di- or trimethoxy, ethoxy or halo silanes, or when the silane radical contains an amino group, as when formed of gamma-amino propyl triethoxy silane and the like, attachment of the resinous or polymeric material subsequently to be applied can be effected also through the described portions of the organo silane radical.

In the preferred practice of this invention, the system is formed of an epoxide resin which is cured with a polyamine and reacted with a silane as in Equations 1, 2 and 3. The epoxide resin portion of the anchoring agent is capable of attachment to epoxy type resins such as are combined with the treated glass fibers in the manufacture of glass fiber reinforced resinous products. The silane radical ties the epoxide polymeric anchoring agent onto the glass fiber surfaces with sufficient force to resist separation even under high humidity conditions thereby to provide a base strongly to tie in the subsequently applied epoxy resins to the glass fiber surfaces.

It will be apparent that the silane modified polymeric complex will be effective to tie in other resins or organic polymers to the glass fiber surfaces.

It will be further understood that the concepts described are applicable not only to tie in resinous systems to glass fibers but that the concepts described are equally applicable in the combination of resinous materials and glass platelets or flexible plates of thin cross-sections. Such platelets or plates are also characterized by high strength and flexibility and can be used in combination with resinous materials in combination with molded and laminated structures.

To the present, presentation has been made of the theoretical concepts of the reactions to incorporate a silane as a part of a film forming resinous polymer which can be used to provide the combined functions of a size for bonding and protecting the fibers while being processed into strands, yarns and fabrics and, with the removal or replacement of a previously applied size composition, of an anchoring agent which becomes preferentially attached to the glass fiber surfaces and functions as a base for the attachment of resinous materials strongly to tie in the resins to the glass fiber surfaces.

The equations which have been set forth are merely given by way of illustration of the possible reactions. be understood that other silanes having from one to three hydrolyzable groups may be employed, as represented by divinyl diethoxy silane, allyl dichloro silane, benzyl trichloro or triethoxy silane, and the like. Similarly, while the epoxy systems and polymers are preferred as the polymer of polymeric forming materials reacted with the silanes in the preparation of the anchoring agent, the polymeric component of the reaction may constitute other resinous polymeric or polymerizable materials such as would be included in the polyesters, polyamides, alkyds, polyacrylates, polyalkylene such as polyethylene, polyvinyl acetate, butadiene-arcylontrile copolymers, trichloro silane appear to be outstanding as one of the reactants in forming the described silane-polymer, it will While gamma-amino propyl triethoxy silane, vinyl triethoxy silane, vinyl chloro diethoxy silane and vinyl amide aldehyde resins such as urea formaldehyde or melamine formaldehyde resins and the like, and in which the polymeric of polymerizable materials are preferably formed to have an amine group available for reaction as in Equations 1 to 5 and 8(A) or a hydroxy group as available in Equations 6 and 8(B).

Description will now be made of the preparation of anchoring agents representative of the foregoing concepts.

EXAMPLE 1

Preparation of an anchoring agent representative of Equation 1:

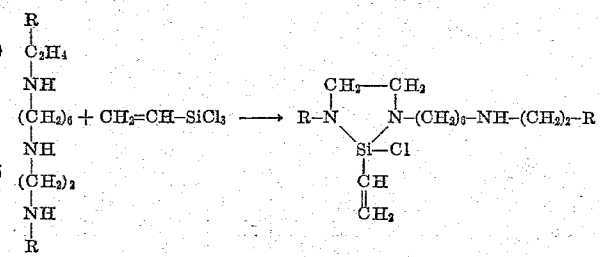

Procedure 72 parts of the polyamine (prepared by reaction of hexamethylene diamine with ethylene dibromide) is dissolved in 250 cc. dioxane which has previously been dried. 200 parts of vinyl dichloro silane is added dropwise with agitation and the resultant solution is refluxed for about 30 minutes. The dioxane solvent and excess trichloro silane are removed by distillation.

The resultant product can be applied to the glass fibers, preferably in forming, from an aqueous medium acidified to a pH of about 4–5. Instead, the product can be taken into solution in a solvent for application onto the glass fibers. Application can be made from a composition in which the anchoring agent is present in an amount ranging from 0.2 to 5.0 percent by weight of the treating composition.

EXAMPLE 2

Preparation of an anchoring agent in accordance with Equation 2:

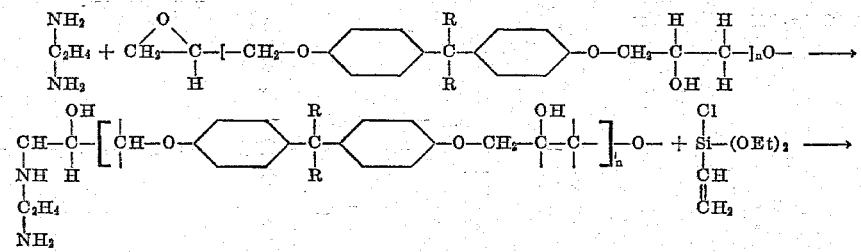

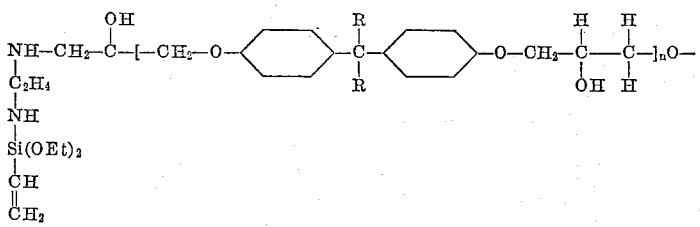

Procedure

A flask is charged with 120 parts ethylene diamine. 140 parts of an epoxy resin (Sheel Epoxy 562 of Shell Chemical Company) is dissolved in dioxane and added dropwise to the ethylene diamine with vigorous agitation and under reflux conditions. Refluxing is continued for about 30 minutes after all of the epoxy resin solution has been added. The dioxane and excess ethylene diamine are removed by distillation up to a temperature of 260° F. After cooling the reaction product to about 100° F., 260 parts of dioxane is added and 180 parts of vinyl diethoxy chloro silane is added dropwise with vigorous stirring and the mixture is refluxed for about 15 minutes after all of the silane has been added. The dioxane and excess silane are removed by distillation to a temperature of about 225° F.

The foregoing represents a reaction to form a catalytic system from the base epoxy material which is reacted with a silane and used subsequently to catalyze the polymerization of an epoxy resin.

The reaction product, in an acidified aqueous medium in a concentration within the range of 0.5 to 5.0 percent by weight, can be applied to the glass fiber surfaces in forming as a size and anchoring agent. The treated fibers can be incorporated in an epoxy resinous system for combination therewith. The applied coating on the surfaces of the glass fibers will enter into the reaction to catalyze the epoxy resin formation and thereby tie in the epoxy resin with the glass fiber surfaces.

It has been found that the coating applied from the composition of Example 2 is excellent when used also as a finish on the glass fiber surfaces when used as a textile material in the absence of any resinous additions or combinations. The coating serves as an excellent base for direct dyeing permanently to color or print the glass fibers and fabrics formed thereof. The silane, amine, and the hydroxy groups have also been found to be effective as anti-static agents thereby to minimize one of the difficulties heretofore encountered in the processing of glass fibers and fabrics formed thereof. In the latter connection, the treating material also finds excellent use with fibers and fabrics formed of other organic synthetic resinous or polymeric materials. Others of the anchoring agents embodying the concepts of this invention can also be used for such purposes.

EXAMPLE 3

Preparation of an anchoring agent in accordance with Equation 4.

Procedure

A reaction flask is charged with 238 parts of N-methyl propyl triethoxy silane. 140 parts of an epoxy resin (Shell 562) is dissolved in 500 parts of diethyl ether and added dropwise to the silane under reflux conditions. Refluxing is continued for about 15 minutes after addition of the silane. The ethyl ether and excess silane are distilled off to a temperature of 150° F.

The resulting product can be employed as a size component in the treatment of glass fibers to adapt the fibers for subsequent combinations with epoxy resinous materials in the manufacture of glass fiber reinforced plastics, laminates or coated fabrics. The epoxy resins adapted for best use with treated glass fibers are catalyzed by either a tertiary amine or an acid anhydride such that reaction can occur between the epoxy residue on the glass fiber surfaces and the added epoxy resins with the amine or hydroxyl groups. Application of the anchoring agent can be made in aqueous medium adjusted to a pH of 3-5 and at a concentration of 0.4 to 4.0 percent by weight.

EXAMPLE 4

Preparation of an anchoring agent in accordance with Equation 6.

Procedure

A reaction flask is charged with 128 parts of vinyl dichloro silane. 169 parts of diglycidyl ether is dissolved in 500 parts of diethyl ether and added dropwise to the vinyl dichloro silane under reflux conditions. Refluxing is continued for a period of about 30 minutes after the vinyl dichloro silane has been added and then the ethyl ether and the excess silane are removed by distillation to a temperature of about 250° F.

The resulting product can be formulated into an aqueous system adjusted to a pH of 3-5 for use in the sizing of the glass fibers, preferably in forming. Application in concentrations of from 0.2 to 5.0 percent can be made by the usual sizing means such as by means of a roller coater or a wiping pad which are contacted by the glass fibers as they are brought together to form a strand of yarn.

In the foregoing system, it is believed that the silane atom can attach itself to the oxirane ring of the epoxy resin or resin forming system.

An anchoring agent embodying a further concept of this invention can also be prepared by an esterification reaction between the oxirane ring of an epoxy compound or polymer and a carboxy silane or by a reaction between a carboxy silane and an amino epoxy resin to form the corresponding amide containing both the epoxy resin and the silane in a single reaction product. The foregoing may be represented by the reaction of delta-carboxy propyl triethoxy silane with the oxirane ring in the epoxy resin as represented by the following equation:

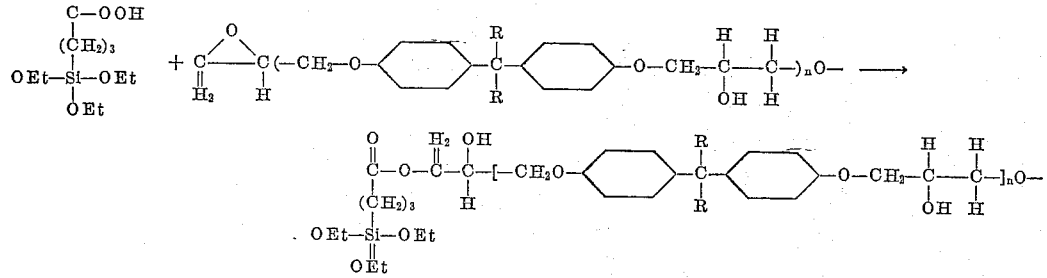

It will be apparent from the foregoing that we have provided the basis of a new reaction for producing a new and improved compound which may be used as an anchoring agent in the treatment of glass fibers to provide the simultaneous functions of a size for the protection of the glass fibers and an anchoring agent for improving the bonding relationship between the treated glass fibers and other resinous materials. While illustration has been made chiefly of the combinations of a silane-epoxy polymeric compound as the anchoring agent for use with epoxy resinous materials, it will be understood that the described reactions may be carried out with other polymeric or polymerizable materials as previously pointed out for beneficial use in the treatment of glass fibers to be combined with other resinous materials, preferably of the type corresponding with the polymerizable or polymeric components into which the silane grouping has been incorporated.

It will be further understood that the described anchoring agents may be incorporated with a lubricant in a size composition for use in the treatment of fibers and that the medium of application and concentration of the anchoring agent in the treating composition may be varied in accordance with the specific requirements.

It will be still further understood that changes may be made from the standpoint of formulation, preparation of the size composition, method of application and use without departing from the spirit of the invention, especially as defined in the following claims.

We claim:

1. A product consisting of glass fiber filaments and a thin coating present as a size on the glass fiber filaments wherein the size comprises a silane-organic polymeric compound having film forming properties wherein the silane component is selected of the group consisting of an unsaturated silane, an amino silane, a hydroxy silane and a carboxy silane, and wherein the organic polymeric component is selected from the group consisting of an epoxy resin and an epoxy resin containing an amino group, and wherein at least one of the components including the silane and the epoxy resin originally contained an amino group, said silane and epoxy resin being joined through the nitrogen atom of the amino group originally present in one of the components.

2. A product as claimed in claim 1 in which the silane is an amino silane.

3. A product as claimed in claim 2 in which the amino silane is gamma-amino propyl triethoxy silane.

4. A product as claimed in claim 1 in which the silane-polymeric compound comprises the product of the reaction of an amino silane and an epoxy resin forming material.

5. A product as claimed in claim 1 in which the silane-organic polymeric compound comprises the product of the reaction of a silanol and a resin forming material containing a group selected from a group consisting of hydroxy, carboxy and amino groups.

6. A product as claimed in claim 1 in which the silane-organic polymeric compound comprises the product of the reaction of an epoxy resin cured with a polyamine and reacted with a silane containing from one to three hydrolyzable groups.

7. The method of sizing, finishing and treating glass fibers to improve the bonding relationship with resinous materials subsequently to be combined with the glass fibers comprising coating the glass fibers with a composition containing an anchoring agent in the form of a silane-organic polymeric compound having film forming properties wherein the silane component is selected from the group consisting of an unsaturated silane, an amino silane, a hydroxy silane and a carboxy silane and wherein the organic polymeric component is selected from the group consisting of an epoxy resin and an epoxy resin containing an amino group, and wherein at least one of the components including the silane and the epoxy resin originally contained an amine group, said silane and epoxy resin being joined through the nitrogen atom of the amino group originally present in one of the components.

References Cited in the file of this patent

UNITED STATES PATENTS

| | | |
|---|---|---|
| 2,541,896 | Vasileff et al. | Feb. 13, 1951 |
| 2,579,418 | Cheronis | Dec. 18, 1951 |
| 2,687,398 | McLean | Aug. 24, 1954 |
| 2,695,276 | Hatcher | Nov. 23, 1954 |
| 2,763,573 | Biefeld | Sept. 18, 1956 |
| 2,776,910 | Grickson et al. | Jan. 8, 1957 |
| 2,819,245 | Shorr | Jan. 7, 1958 |
| 2,832,754 | Jex et al. | Aug. 29, 1958 |
| 2,854,354 | Gottlieb | Sept. 30, 1958 |
| 2,920,095 | Jex et al. | Jan. 5, 1960 |
| 2,931,739 | Marzocchi et al. | Apr. 5, 1961 |
| 2,943,103 | Jex et al. | June 28, 1960 |
| 2,946,701 | Plueddemann | July 26, 1960 |
| 3,033,815 | Pike et al. | May 8, 1962 |

FOREIGN PATENTS

| | | |
|---|---|---|
| 202,627 | Australia | July 20, 1956 |
| 760,309 | Great Britain | Oct. 31, 1956 |
| 544,555 | Belgium | Feb. 15, 1956 |
| 1,145,323 | France | May 6, 1957 |
| 1,149,677 | France | July 22, 1957 |

OTHER REFERENCES

Brady et al.: "Reactive Silicone Resin Intermediates," Paint and Varnish Production, January 1958, pages 25–31.

Skeist: Epoxy Resins, Reinhold Publishing Corp., New York, 1958, page 80.